(No Model.) 3 Sheets—Sheet 1.
A. H. & P. A. LINDBERG.
PIANO STOOL.
No. 468,916. Patented Feb. 16, 1892.
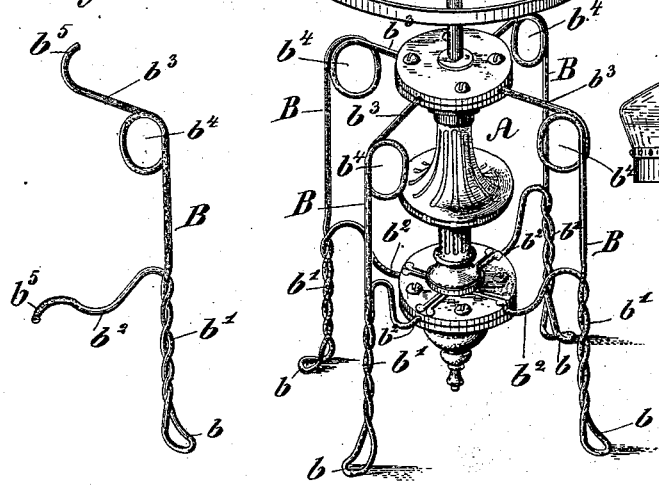
WITNESSES:
John A. Rennie
Herbert Blossom
INVENTORS:
Andrew H. Lindberg
Peter A. Lindberg
By Henry Connett
Attorney.

(No Model.) 3 Sheets—Sheet 2.

A. H. & P. A. LINDBERG.
PIANO STOOL.

No. 468,916. Patented Feb. 16, 1892.

WITNESSES:
John A. Rennie
Herbert Blossom

INVENTORS.
Andrew H. Lindberg
Peter A. Lindberg
By Henry Connett
Attorney.

THE NORRIS PETERS CO., PHOTO-LITHO., WASHINGTON, D. C.

(No Model.)  3 Sheets—Sheet 3.

A. H. & P. A. LINDBERG.
PIANO STOOL.

No. 468,916. Patented Feb. 16, 1892.

WITNESSES:
John A. Rennie
Herbert Blossom

INVENTORS:
Andrew H. Lindberg.
Peter A. Lindberg.
By Henry Connett
Attorney.

UNITED STATES PATENT OFFICE.

ANDREW H. LINDBERG AND PETER A. LINDBERG, OF NEW YORK, N. Y.

PIANO-STOOL.

SPECIFICATION forming part of Letters Patent No. 468,916, dated February 16, 1892.

Application filed June 10, 1891. Serial No. 395,752. (No model.)

*To all whom it may concern:*

Be it known that we, ANDREW H. LINDBERG and PETER A. LINDBERG, both citizens of the United States, and residents of the city, county, and State of New York, have jointly invented certain Improvements in Piano-Stools and the Like, of which the following is a specification.

Our invention relates to piano and other stools or seats of a similar character which are adapted to be raised and lowered by a screw, and in particular to that class of seats whereof the frames are of metal.

The object of the invention is to improve the construction of the base portion and legs, whereby the latter are formed of bent and twisted rods so constructed as to impart some springiness or elasticity to the seat, in part to improve the construction of the bearing of the screw adjustable seat-stem, and in part to provide the frame with a removable upholstered seat and means for securing said seat to the frame, all of which will be more fully described hereinafter.

The novel features of the invention will be clearly defined in the claims.

Figure 3:
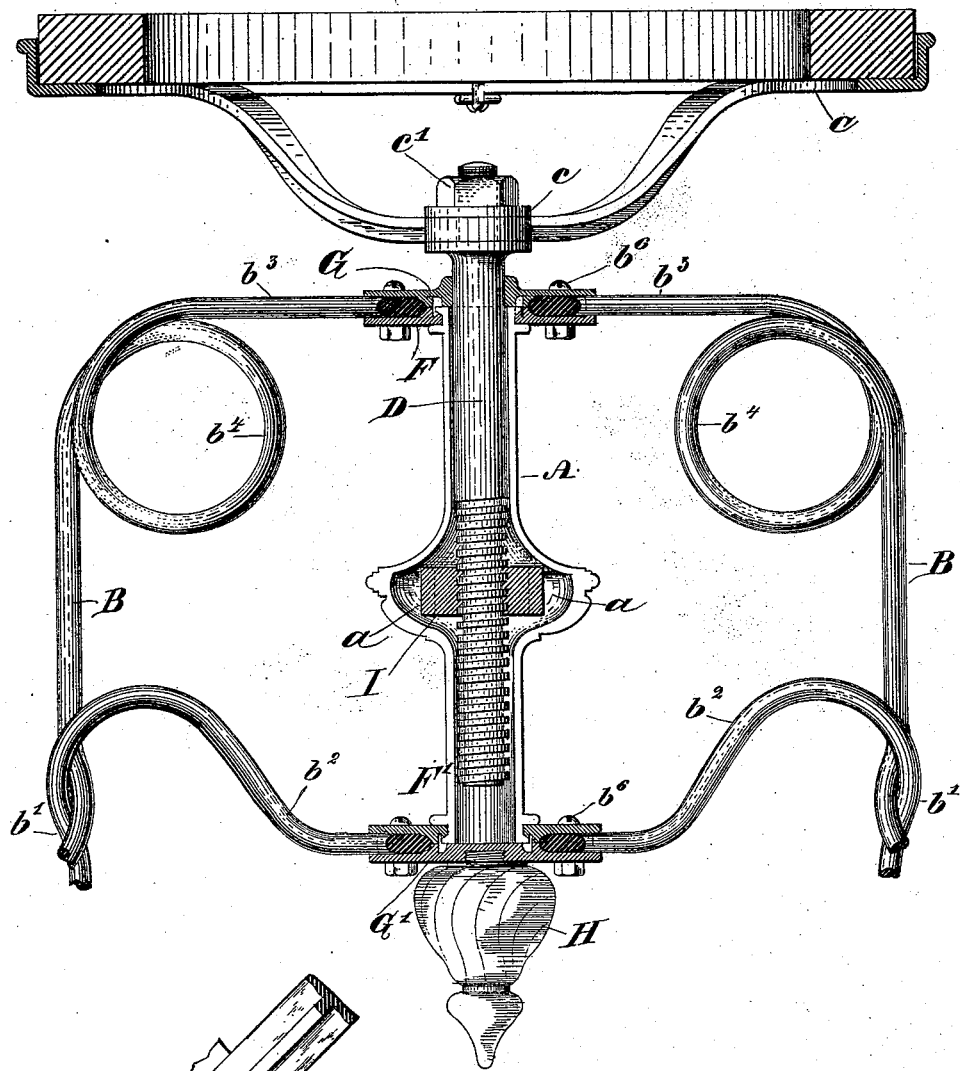
Figure 4:
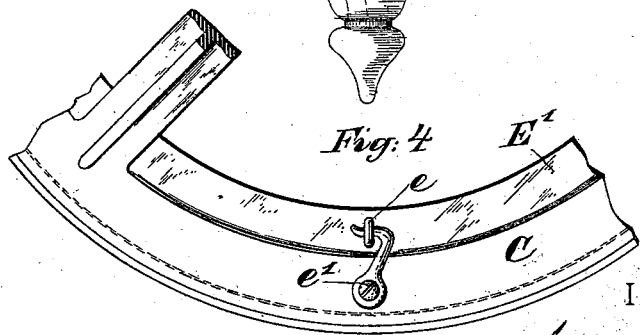
Figure 8:
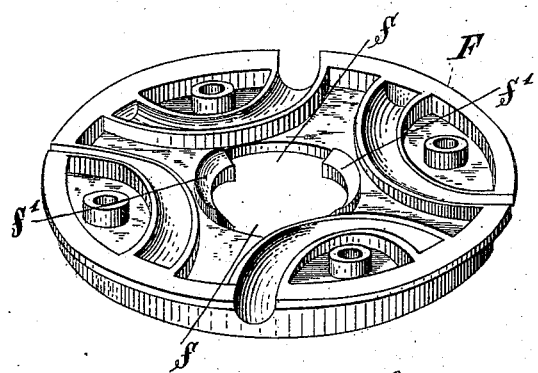
Figure 9:
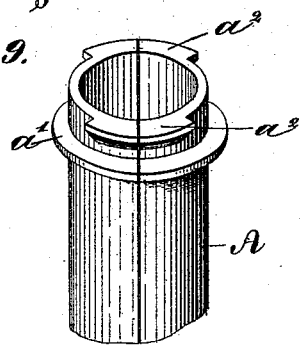

In the accompanying drawings, which serve to illustrate the invention as embodied in a piano-stool, Figure 1 is a perspective view, on a small scale, of the metal portion of the stool; and Fig. 1ª is a view of the upholstered seat detached. Fig. 2 represents one of the legs of the stool detached and in perspective. This view is on the same scale as Fig. 1. Fig. 3 is a sectional elevation of the stool on a much larger scale, showing the construction of the stem of the stool and of the attachment of the legs thereto. Fig. 4 is an under side view of a part of the flanged rim of the seat-frame, showing the means for securing the removable seat to the same. Fig. 5 is a cross-section of the stem of the stool, taken in the plane of the nut housed therein and showing the sections of said stem separated. Figs. 6 and 7 are views of the two forms of grooved clamping-disks on the stem of the stool for securing the legs thereto. Figs. 8 and 9 are respectively perspective views of one of the grooved leg-securing disks and of the upper end of the stem of the stool, illustrating the means for locking the disk on said stem.

A represents as a whole the central hollow stem of the stool, and B the legs thereof.

C is the flanged seat-frame, and D the stem thereof.

E is the upholstered seat.

The construction of the stem of the stool, the legs thereof, and the mode of securing the legs to said stem will be first described. The stem A is made hollow, preferably of cast metal, and of two like parts or halves separated or divided longitudinally and axially. In Fig. 5, which is a cross-section at the wider central portion of the stem A, these two sections are represented as drawn apart or separated in order to illustrate the construction and the mode of mounting the nut I therein. This nut has squares or squared lugs which fit into recesses $a\ a$ in the respective sections of the stem A at its widest part when said sections are brought together to form the stem. This nut receives the screw on the stem D of the seat, as seen in Fig. 2, the tubular passage in the stem A above and below the nut serving as guides for said stem D. Each leg B is formed of a single rod or wire bent or doubled upon itself and twisted together to form the foot $b$ and the twisted portion $b'$. The lower lateral branch $b^2$ of the rod is attached to the lower part of the stem A and the upper lateral branch $b^3$ of the rod has a coil $b^4$ bent in it in the manner of a coil-spring and is attached to the upper part of the stem A. The manner of securing the branch of the leg to the stem is best illustrated in Figs. 3, 6, and 7. On the upper and lower ends of the stem A are secured, respectively, the grooved disks F and F', which are or may be alike. The disk F' is seen in plan in Fig. 6, and this view will serve as well to illustrate the construction of the disk F. The disk has a central aperture to receive the end of the stem and binds them together. In the face of the disk are formed four curved grooves, which are semicircular in cross-section, and these grooves receive the curved or bent extremities $b^5$ of the lateral branches on the legs B. In Fig. 6 these branches are seen in place in the grooves in the disk. After the branches on the legs are in place in the grooves in the disks F and F' they are secured by other clamping-disks G and G', the disks F and G forming one pair of clamping-disks and the plates F' and G' forming the other pair, as clearly seen in Fig. 3. The disk G has grooves in its face which register with those in the disk F and the disk G' has grooves in it which register with those in the disk F'. This disk G' is seen in plan in Fig. 7. The pairs of clamping-disks will be secured together by screws or bolts $b^6$, as clearly shown. The disk G differs from the disk G' only in having a central aperture for the passage of the stem D, which should fit said aperture snugly, so that said stem will have a bearing at this point and another in the nut L, some four inches below. In order to better brace the legs, we prefer to turn the bent extremity of the lower branch $b^2$ of the leg in one direction and that of the upper branch $b^3$ in the opposite direction; but this is not essential. In this case the grooves in the respective pairs of clamping-disks will of course be curved to correspond.

As the stem A is composed of two sections and the disks F and F' are employed to secure these sections together, we employ the means best illustrated in Figs. 3, 6, 8, and 9 for securing said disks on the stem. As the construction is the same for both disks, a description of that employed for disk F will suffice. On the stem A, at a little distance from its end, is formed a collar $a'$ to support the disk F or F', as the case may be, and at the extremity of the stem are formed two oppositely-arranged beveled locking-flanges $a^2$. The central aperture in the disk, which embraces and fits the stem, has marginal recesses $f$, seen in Fig. 8, which permit the flanges $a^2$ to pass when the disk is slipped over the stem. When the disk has been slipped on and rests on the collar $a'$, it is rotated about the stem until the locking-flanges $a^2$, which are beveled on their lower faces, take over the beveled faces at the margin of the aperture in the disk and hold the disk down firmly in place. The disk G rests on the upper extremity of the stem A, and the disk G' (which is seen in Fig. 7) rests on the lower extremity of said stem. H is merely an ornament or boss screwed into the disk G'. The flanged seat-frame C will usually be of cast metal and be secured to the stem D through the medium of the boss $c$ and nut $c'$ on said stem, as clearly shown on the drawings. The upholstered seat E will have as a base a ring E', of wood, which finds a seat within the raised flange on the seat-frame, and as a means of securing the seat removably in the frame we employ some suitable fastening, that illustrated in Fig. 4 serving the purpose. This fastening consists of an eye $e$ in the wooden ring E' and the hook $e'$ on the rim of the seat-frame, said hook being adapted to engage said eye. There may be two or more of these fastenings arranged oppositely on the base of said seat-frame.

It will be readily seen that our construction provides a long bearing for the screw D of the seat above the nut I, and consequently should the seat be raised until the screw has passed entirely out of the nut the seat will not topple over and fall off by reason of the deep socket or bearing, which still houses and steadies said screw.

The legs B, which will be plated or japanned, may be made quite ornamental and will afford a somewhat springy or elastic support for the seat. By making the stem A in two sections we are enabled to get the nut properly in place therein, and the disks F and F' serve to bind the sections of the stem together, as well as to form each a member of the clamp for the branch on the leg. The stem A will be embraced endwise by and between the disks G and G'.

Having thus described our invention, we claim—

1. In a stool, the combination, with the seat-frame and its screw-threaded stem, of the hollow stem A, provided with a nut I to receive the stem of the seat, and the legs B, formed each of a bent and twisted metal rod, the branches $b^2$ and $b^3$ of which are secured to the stem A at different levels, whereby the said stem and the adjustable seat are provided with a spring-support, as set forth.

2. In a stool, the combination, with the seat-frame and its screw-threaded stem, of the stem A, constructed of two parts by a longitudinal division and having an internal recess to receive the nut I, the said nut, the pairs of grooved clamping-disks on said stem A, and the branched legs B, formed of bent metal rods, the ends of the branches on said legs being clamped between the disks of each pair, substantially as set forth.

3. In a stool, the base portion comprising the stem A, provided with collars $a'$, one near each end, the grooved disks F F', which embrace the stem A and rest on the respective collars, the grooved disks G G', between which the stem is embraced longitudinally and which are secured to the respective disks F and F', and the legs B, each of which has two branches, which are clamped between the disks, as set forth.

4. In a stool, the combination, with a central stem A and clamping-disks for attaching the legs thereto, of the said legs B, each composed of a rod bent to form a foot $b$, having a twist $b'$, a coil $b^4$, and two lateral branches $b^2$ and $b^3$, secured at their extremities to said stem, substantially as set forth.

In witness whereof we have hereunto signed our names in the presence of two subscribing witnesses.

ANDREW H. LINDBERG.
PETER A. LINDBERG.

Witnesses:
HENRY CONNETT,
CHAS. A. WALSH.